US012762273B1

(12) United States Patent
Tang et al.

(10) Patent No.: US 12,762,273 B1
(45) Date of Patent: Oct. 13, 2026

(54) DATA CLEAN ROOM WITH EXPORTABLE, PRIVACY-PRESERVING LABELS

(71) Applicant: Amazon Technologies, Inc., Seattle, WA (US)

(72) Inventors: Shuai Tang, New York, NY (US); Sergul Aydore, Hoboken, NJ (US); Zhiwei Wu, Pittsburgh, PA (US); Aaron Leon Roth, Philadelphia, PA (US); Michael Kearns, Philadelphia, PA (US); Ge Liu, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 199 days.

(21) Appl. No.: 18/541,544

(22) Filed: Dec. 15, 2023

(51) Int. Cl.
*G06F 21/60* (2013.01)
*G06F 21/62* (2013.01)

(52) U.S. Cl.
CPC ........ *G06F 21/6245* (2013.01); *G06F 21/604* (2013.01)

(58) Field of Classification Search
CPC ........................... G06F 21/6245; G06F 21/604
USPC ........................................................... 726/26
See application file for complete search history.

(56) References Cited

U.S. PATENT DOCUMENTS 12,105,837 B2 * 10/2024 LaTerza .................. G06F 40/40
2016/0283738 A1 * 9/2016 Wang ..................... G06N 20/00
2020/0394320 A1 * 12/2020 Bernau .................... G06N 3/08
2021/0165901 A1 * 6/2021 Chandrashekhar .... G06N 20/20
2021/0173856 A1 * 6/2021 Chitnis ............... G06F 21/6227
2021/0174153 A1 * 6/2021 Rane ..................... G06F 18/217
2022/0004933 A1 * 1/2022 Gu ...................... G06F 16/9027
2022/0108026 A1 * 4/2022 Ortiz ................... G06F 12/1408
2022/0255764 A1 * 8/2022 Li ......................... G06F 21/606
2022/0335160 A1 * 10/2022 Chapman ............... G06N 3/048
2023/0059367 A1 * 2/2023 Lai ...................... G06F 21/6245
2023/0137378 A1 * 5/2023 LaTerza .................. G06F 40/40 726/26
2023/0205915 A1 * 6/2023 Wang ................. G06Q 30/0631 726/26

(Continued)

FOREIGN PATENT DOCUMENTS

KR 102557800 B1 * 7/2023 ............. G06N 20/20

OTHER PUBLICATIONS

Lichuan Ma; Federated Data Cleaning: Collaborative and Privacy-Preserving Data Cleaning for Edge Intelligence; IEEE: Year:2020; pp. 6757-6770.*

*Primary Examiner* — Monjur Rahim
(74) *Attorney, Agent, or Firm* — Eversheds Sutherland (US) LLP

(57) ABSTRACT

Systems, devices, and methods are provided for providing data clean room capabilities that allow for the export of privacy-preserving labels. A data clean room may be provisioned to obtain datasets from various parties. Code executing in the data clean room may select a differential privacy machine-learning model from a plurality of differential privacy machine-learning models train the selected differential privacy machine-learning model to infer noisy labels, determine a set of users of interest for a multi-party collaboration effort, infer, using the differential privacy machine-learning model, a set of noisy labels for the set of users, and determine an exportable dataset that comprises the noisy labels rather than private labels containing sensitive/private information.

20 Claims, 6 Drawing Sheets

(56) References Cited

U.S. PATENT DOCUMENTS

| | | | | |
|---|---|---|---|---|
| 2023/0289469 | A1* | 9/2023 | Uzun | H04L 9/0866 |
| 2023/0315885 | A1* | 10/2023 | Singh | G06V 10/764<br>726/27 |
| 2023/0319296 | A1* | 10/2023 | Desai | H04N 21/44218<br>375/240.12 |
| 2023/0385444 | A1* | 11/2023 | Cresswell | G06F 21/6254 |
| 2024/0143416 | A1* | 5/2024 | Rogers | G06F 9/54 |
| 2024/0265294 | A1* | 8/2024 | Ghazi | G06N 7/01 |
| 2025/0307704 | A1* | 10/2025 | Sun | G06N 20/00 |

* cited by examiner

DATA CLEAN ROOM WITH EXPORTABLE, PRIVACY-PRESERVING LABELS

BACKGROUND

Facilitating multi-party data collaboration efforts presents many challenges. Among these challenges is the difficulty in striking a delicate balance between preserving individual privacy and maintaining data utility. In many cases, multiple parties may collaborate through the use of a data clean room that serves as a secure and controlled environment for facilitating multi-party data collaboration while preserving individual privacy and data confidentiality. In this setting, data from multiple parties can be collectively analyzed and insights can be derived from their respective datasets without directly sharing the raw data with other parties.

However, there are additional use cases and collaboration workflows that are unable to utilize conventional data clean rooms. For example, a feature of data clean rooms is that they prevent the export of sensitive or private information—however, it may be the case that such information would be useful to a counterparty (e.g., for training custom machine-learning models). It is therefore apparent that there is a need for further improvements to data clean room technologies that allow for further types of collaboration between multiple parties, while still abiding by the mission to always protect the privacy of individual users.

Figure 1:
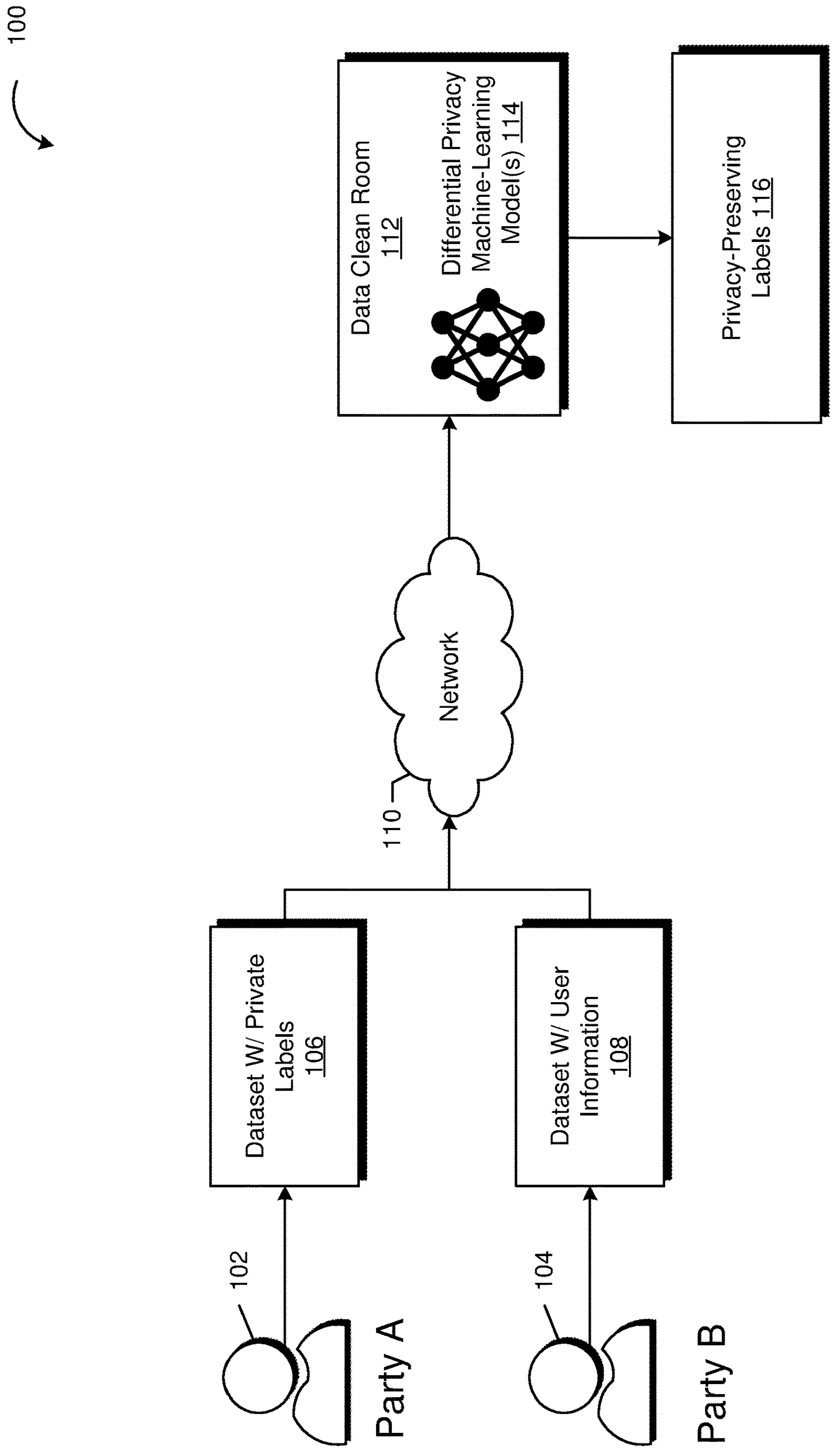
FIG. 1 illustrates a computing environment 100 in which one or more techniques for determining privacy-preserving labels may be implemented, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for providing data clean room capabilities that allow for the export of privacy-preserving labels.

Various techniques described herein may be utilized by multiple parties to apply privacy-safe machine-learning over combined datasets. These datasets may include information regarding users, such as demographic information, purchase history, click-through behavior, and more. An entity with such data may wish to provide information regarding a group of users while still withholding information about specific users. For example, an advertiser may wish to provide a publisher with information regarding click-through rates or purchase rates of a group of users matching certain demographic characteristics, but not divulge the specific behavior of any specific user within the group. As a second example, a hospital network may have certain personal health information (PHI) that a medical research organization that wishes to use to train a machine-learning model to identify whether individuals with certain characteristics are at higher risk of a disease or condition, but the PHI is subject to privacy regulations such as HIPAA (Health Insurance Portability and Accountability Act) that restrict and govern the release of such data.

Embodiments described herein may relate to the use of differential privacy to provide information about a group of users while withholding information about specific users. Data providers can specify a quantitative level of privacy protection that is required for sensitive data. These techniques can be utilized to solve technical challenges involved in multi-party computing environment where there are competing goals of (1) ensuring privacy protection of sensitive data and (2) facilitating collaboration between multiple parties through the sharing of data.

According to at least one embodiment of the present disclosure, data privacy of seed labels is implemented by adding noise to the labels through the use of a differential privacy (DP)-based machine-learning model. In various embodiments, the DP-based machine-learning model is trained to infer privacy-preserving labels given true labels. The DP-based machine-learning model may be trained in a data clean room using labels that include true labels that include or otherwise encode sensitive data. In various embodiments, the true labels are unexportable from the data clean room and cannot be directly shared with other parties. The DP-based machine-learning model may be trained to generate privacy-preserving labels that could be right or wrong, relative to the true labels that are provided to the data clean room. Training datasets with privacy-preserving label may be exported from the data clean room, and utilized for various purposes, such as to train a downstream machine-learning model.

An illustrative, non-limiting framework for training a custom machine-learning model with privacy guarantees for sensitive data comprises: provisioning a data clean room for receiving datasets from multiple parties, obtaining, at the data clean room and from a first party, a first dataset that comprises sensitive data. The first dataset may be in the form of tabular data in various formats (e.g., text, dates, strings, numerals, Booleans, and so on and so forth). An embedding algorithm may be applied on the raw tabular data to determine embedding vectors. Seed users may be provided the data clean room by a second party. A differential privacy (DP)-based machine-learning model may be trained to infer privacy-preserving seed labels from the user vectors. The trained DP-based ML model may then be used to compute privacy-preserving seed labels. The privacy-preserving seed labels may be exported from the data clean room without compromising the privacy guarantees that are provided to the first party. As an example, a training dataset comprising the privacy-preserving labels may be prepared in the data clean room and exported.

Data privacy for users of various electronic platforms is important. Techniques described herein may be utilized to improve the privacy of user data. Through the use of differential privacy techniques, information regarding groups of users (e.g., in the form of a dataset) may be utilized in multi-party settings that allows for information about the groups to be shared without divulging information about any specific user. There are different layers and types of privacy risks that the systems and methods described herein may address, these include: (i) label privacy, wherein the risk involves revealing whether a user is in a seed list; and (ii) user-level privacy, wherein the risk involves revealing the existing of a user in a counterparty's dataset. For example, if a malicious publisher bring in a piece of code that directly returns the true seed users, then whether a user is in the seed user is exposed to the publisher, and this can reveal information such as the user's interaction data (e.g., whether the user clicked an ad or purchased an item). Even if the publisher doesn't bring malicious code, after observing the predictions, there is the possibility that membership inference attack (MIA) algorithms could expose this information. As a second example, if a malicious publisher brings code that directly returns the true seed users, the observation that a user exists in the seed users also reveals that the user exists in the advertiser's dataset.

In various embodiments, the techniques described herein provide plausible deniability to individual users regarding whether they exist in an advertiser's database and, as a consequence, also provides label privacy with respect to whether said user is in the seed list.

In the context of differential privacy, "plausible deniability" relates to the ability of a system to provide privacy guarantees for individuals while allowing them to deny or plausibly deny their participation in a specific dataset. This can be important in a variety of scenarios where individuals contribute their data for analysis or statistical purposes, and they want to protect their privacy. For example, an individual may wish to provide personal health information (PHI) for use in research but does not wish for his/her participation or non-participation in the research effort to be known.

Differential privacy aims to ensure that the inclusion or exclusion of any single individual's data does not significantly impact the output of a query or analysis. Plausible deniability is achieved by introducing randomness or noise to the data in a way that obscures the contribution of any single individual, making it difficult to determine whether a specific person's data is included in the dataset.

By incorporating plausible deniability, individuals can participate in data-sharing processes without fear of their sensitive information being explicitly disclosed. This helps to strike a balance between the need for collecting valuable data for analysis and the protection of individual privacy.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which one or more techniques for determining privacy-preserving labels may be implemented, in accordance with one or more example embodiments of the present disclosure.

According to at least one embodiment, computing environment 100 comprises a first party 102, a second party 104, a first dataset 106 with private labels, a second dataset 108 with user information, a network 110, a data clean room 112, differential privacy (DP) machine-learning model(s) 114, and privacy-preserving labels 116.

In various embodiments, a party refers to one more computer systems under the control of an organization. For example, party 102 may refer to a first organization or computer systems under the control of said first organization, and party 104 may refer to a different organization or different computer systems under the control of that organization. In various embodiments, first party 102 has access to data regarding its customers or users, which may be stored and accessed via databases or other storage systems that are private to the first party. In various embodiments, first party 102 keeps certain data—such as private labels of first dataset 106—hidden from second party 104 and/or other parties. First party 102 may have various reasons for keeping such data private or hidden from other parties. For example, the data may include proprietary data that the first party does not wish to be known to other parties. As a second example, the data could be subject to data governance policies that restrict the manner in which the data is disseminated—for example, personal health information (PHI) could be subject to government regulations such as HIPAA (Health Insurance Portability and Accountability Act). As yet another example, the data could be subject to terms of service that specify the manner in which a platform is allowed to share its users' personal data.

Datasets described herein may refer to data of any type and may contain user information at the granularity of specific users. For example, users may be identified by a User ID and each user may be associated with various fields and information. First party 102 may contribute first dataset 106 with private labels to data clean room 112. A private label in this context may refer to information that should be kept private from other parties, such as second party 104 depicted in FIG. 1. For example, a private label in the context of medical research may refer to whether a patient has a particular disease or condition. As a second example, a private label may refer to advertiser data, such as whether a user clicked on an advertisement, purchased an item, or other such interaction data. Second party may contribute second dataset 108 with user information to data clean room 112. The users may meet certain criteria or have certain characteristics in common. For example, a publisher may have data regarding product sales or interaction for users of its platform, and an advertiser may wish to serve advertisements to similar or "look-alike" users on the advertiser's platform based on the interaction data that the publisher has access to. However, the publisher may be reluctant or unable to directly share this data with the advertiser. In some cases, applicable rules or regulations may prohibit this data from being directly shared. In some cases, the data is particularly sensitive or private such that it cannot and/or should not be shared directly in a personally identifiable manner.

While various embodiments described throughout this disclosure make reference to "users", "user identifiers", and/or "user information", the techniques described herein may be likewise applicable to various types of subjects. For example, a dataset as described herein may comprise records for different individuals that are uniquely associated with an email address. Likewise, a dataset as described herein may comprise records for different machines that are uniquely associated with a machine identifier. In some embodiments, subjects may refer to intangible entities, such as online storefronts, instances of a software program, and so on and so forth. It should be understood that various figures and descriptions relating to users may be likewise applicable to subjects that are not necessarily considered users, but may be other types of subjects that can be uniquely identified. In various embodiments, subjects are assigned subject identifiers that can be considered as subject identification information, and these identifiers uniquely resolve to a specific subject. In some embodiments, a subject identifier can be assigned to different types of subjects, such as Subject Identifier A being assigned to a human being and Subject Identifier B being assigned to a mobile device.

Accordingly, in various embodiments, instead of directly sharing sensitive data (e.g., private labels) between parties, a data clean room 112 may be utilized so that private/sensitive data is preserved. First party 102 and second party 104 may collaborate in a privacy-preserving manner using data clean room 112. In this context, privacy may refer to the privacy of individual users.

A third-party—such as a computing resource service provider—may be an entity that is trusted by participants of a multi-party data collaboration workflow. First party 102 and second party 104 may mutually agree to provide datasets to a data clean room 112. The trust regime may be such that there is an agreement between the participants and the operator of the data clean room as to how data being contributed by the party/parties is utilized. For example, it may be the case that the parties mutually agree that any datasets contributed to data clean room 112 will be unexportable from the data clean room, meaning that datasets will be kept private within data clean room 112 and not determinable outside of the data clean room. In some embodiments, cryptographic techniques, such as encryption and decryption, are utilized to ensure that datasets are kept secure in the data clean room.

Data clean room 112 may be implemented as an isolated computing environment within a computing resource service provider that provides a secure environment for which to run applications or executable code using datasets that are provided to the data clean room 112, such as first dataset 106 and second dataset 108. In some embodiments, the data clean room is executed in the context of a protected execution environment. An example of a protected execution environment is an enclave of a processor utilizing Intel Secure Guard eXtensions (SGX) technology or a trusted platform module (TPM).

Data clean room 112 may be provisioned with one or more differential privacy (DP) machine-learning model(s) 114. In various embodiments, a DP-based model is trained using first dataset 106 with private labels or a portion thereof. In various embodiments, the first dataset is organized into rows or records by user ID, and information regarding users is in a raw tabular format. In various embodiments, an embedding algorithm (e.g., one-hot encoding) is applied on the raw tabular data to create embedding vectors. These embedding vectors may be numerical representations of users in a multi-dimensional space, designed to capture semantic relationships and similarities between users. In various embodiments, the embedding vectors are used to train one or more privacy-preserving models within data clean room 112, such as differential privacy machine-learning model(s) 114 depicted in FIG. 1. In various embodiments, differential privacy machine-learning model(s) 114 refers to model(s) that is/are trained to infer privacy-preserving labels from true labels in a privacy-preserving manner. Privacy-preserving labels may be true—in the sense that they match the underlying true labels inputted to a DP model—or false. Privacy-preserving labels may be exported from data clean room 112 in place of true labels. For example, privacy-preserving labels 116 may be generated for seed users (e.g., derived from second dataset 108) and exported from the data clean room. A privacy-preserving label for a user may be true or false with respect to the underlying private label and provide for plausible deniability. Plausible deniability, in the context of differential privacy, refers to the property that the inclusion or exclusion of a particular individual's data should not significantly impact the outcome or result of a query or analysis. This property ensures that individuals can claim ignorance or deny any association with specific data points, contributing to the protection of privacy in the presence of differential privacy mechanisms. Various data clean room techniques and mechanism for generating privacy-preserving labels are described in greater detail below. For example, techniques described in connection with FIGS. 2-5 may be implemented in the context of FIG. 1.

Privacy-preserving labels 116 may be inferred by differential privacy machine-learning model(s) 114. In various embodiments, one of the parties (e.g. first party 102, second party 104) specifies one or more differential privacy parameters. A privacy budget may be determined based on the privacy parameter(s) that is used to select a suitable DP-based machine-learning model. For example, a privacy budget may be used to select either a private mean release algorithm or DP-EBM (differentially private explainable boosting machine) algorithm for training and inferencing. Selection, training, and inferencing by differential privacy machine-learning model(s) 114 may be implemented using techniques described in connection with FIGS. 2-4.

In various embodiments, data (e.g., first dataset 106 and/or second dataset 108) are transmitted and/or received over a communications network 110 using a transmission medium via the network interface device/transceiver utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. The term "transmission medium" shall be taken to include any intangible medium that is capable of storing, encoding, or carrying instructions for execution by the electronic computer systems and includes digital or analog communications signals or other intangible media to facilitate communication of such software.

Figure 2:
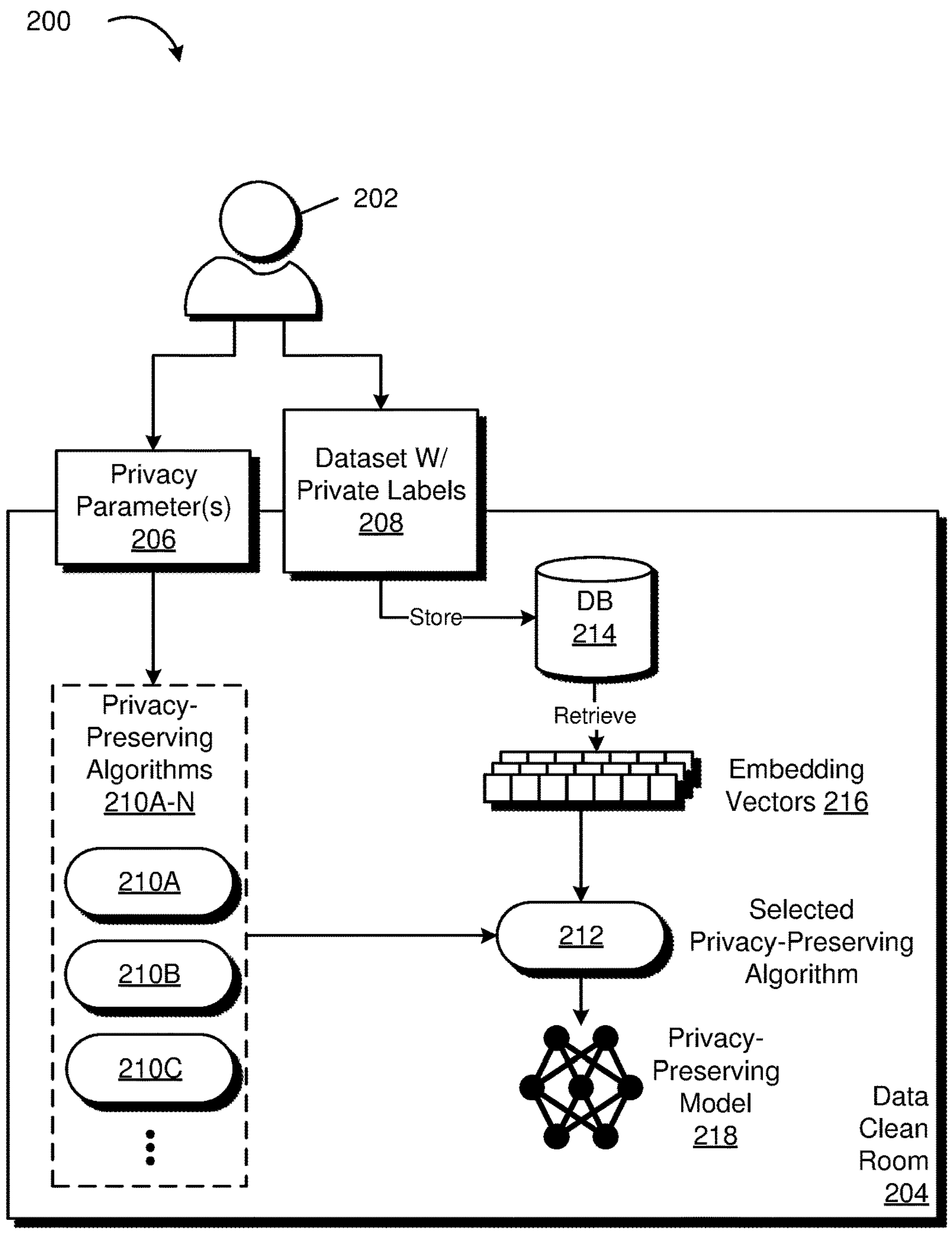
FIG. 2 illustrates a computing environment 200 in which a party to a data collaboration effort provides a dataset with private labels to a data clean room environment, in accordance with one or more example embodiments of the present disclosure.

FIG. 2 illustrates a computing environment 200 in which a party to a data collaboration effort provides a dataset with private labels to a data clean room environment, in accordance with one or more example embodiments of the present disclosure.

According to at least one embodiment, computing environment 200 comprises a party 202 of a multi-party data collaboration effort, a data clean room 204, privacy parameter(s) 206, dataset 208 with private labels, a plurality of privacy-preserving algorithms 210A-N, selected privacy-preserving algorithm 212, database (DB) 214, embedding vectors 216, and privacy-preserving model 218.

In various embodiments, party 202 refers to a participant of a multi-party data collaboration workflow that is responsible for contributing a dataset. In various embodiments, the party 202 refers to an organization or computing entities under the control of said organization. Party 202 may electronically provide contributes to data clean room 204. In various embodiments, a protocol for a multi-party data collaboration workflow calls for party 202 to contribute privacy parameter(s) 206 and/or dataset 208 with private labels by transmitting such information over a communications network (e.g., via a secure connection) to a computing resource service provider that hosts and/or operates services for data clean room 204.

In various embodiments, party 202 is allowed to specify privacy parameter(s) 206 that govern the usage of private or sensitive label that party 202 contributes to the multi-party data collaboration effort. In various embodiments, party 202 is able to select one or more factors relating to a privacy budget, including but not limited to privacy loss parameters, failure probability parameters, or others, as well as hyperparameters for relaxing projections, including but not limited to numbers of adaptive rounds, numbers of queries considered in each round, or sizes of the synthetic datasets. In some embodiments, the privacy budget may be large, such as where the original dataset includes personal data subject to protections of one or more laws or regulations such as HIPAA (Health Insurance Portability and Accountability Act), party 202 may ensure that privacy is maintained by selecting hyperparameters accordingly. In some other embodiments, where the privacy requirements imposed by laws, regulations or other authorities are not as strict, a lower privacy budget may be maintained, and hyperparameters may be selected accordingly.

A set of one or more privacy parameter(s) 206 may be provided by party 202 to data clean room 204. In various embodiments, privacy parameters may include a privacy loss parameter, a failure probability parameter, or a concentrated differential privacy parameter, or any other privacy parameter. For example, in some implementations, the user may designate a first privacy parameter (e.g., a privacy loss parameter) $\epsilon$, and a second privacy parameter (e.g., a failure probability parameter) $\delta$, based on the first privacy parameter $\epsilon$ and the second privacy parameter $\delta$, a third privacy parameter $\rho$ (e.g., a zero-concentrated differential privacy parameter, or "zCDP") may be calculated according to the equation $\epsilon=\rho+2\sqrt{\rho\log(1/\delta)}$. In some embodiments, one or more of the privacy parameters are set to a predetermined, fixed value.

In various embodiments, the failure probability parameter $\delta$ is set to a fixed value and party 202 specifies a privacy loss parameter c that is used to select a privacy-preserving machine-learning algorithm from a plurality of privacy-preserving machine-learning algorithms. In some embodiments, the data clean room is provisioned to be capable of performing training using each of the plurality of privacy-preserving machine-learning algorithms. In some embodiments, the data clean room will determine an appropriate algorithm using the privacy parameter(s) and is capable of performing training using the selected algorithm.

In various embodiments, the privacy loss parameter c can be tuned based on the needs of the party, and the selection of a privacy-preserving algorithm from plurality of privacy-preserving algorithms 210A-N may be determined based at least in part on privacy loss parameter $\epsilon$. FIG. 2 depicts an illustrative example with N algorithms. N may be 1, 2, 3, or any suitable number, such that each algorithm may be selectable based on the privacy parameters that are provided to data clean room 204. A privacy-preserving algorithm (e.g., 210A, 210B, 210C, or others) may refer to software code, functions, library, applications, etc. that can be executed to train a privacy-preserving model on embedding vectors.

For example, when an advertiser only wants to run a few campaigns, $\epsilon>1$ may be suitable so that each campaign has ample privacy budget. In such cases, a DP-EBM (differentially private explainable boosting machine) algorithm may be chosen as the selected algorithm 212. When $\epsilon\leq 1$—which may be the case when the advertiser has many campaigns to run, each campaign will have a limited privacy budget. In such cases, private mean release may be chosen as the selected algorithm 212. In various embodiments, the privacy budget is related to three values, including the privacy budget per campaign, the maximum number of campaigns, and the total privacy budget. These variables are related, such that if two are given, the third can be computed.

In some embodiments, a fixed, predetermined upper threshold for the privacy loss parameter $\epsilon$ may be specified. In some embodiments, the privacy loss parameter $\epsilon$ should not be set to a value greater than 20 or some other upper bound in which the privacy protections would be minimal or unacceptable. In various embodiments, the upper threshold can be specified by the parties; in some embodiments, the service provider of the data clean room sets an upper limit to prevent the possibility of an inadvertent disclosure of sensitive data.

In consideration of privacy protection for the contributing party's data, party 202 may be allowed to control how sensitive data that it provides will be utilized. In some embodiments, party 202 is allowed to set (e.g., unilaterally) the privacy budget, or more directly, the number of campaigns. A privacy budget may be determined, and then a privacy budget per campaign may be ascertained. In various embodiments, the privacy budget is specified through the set of privacy parameters. In various embodiments, each of the plurality of privacy-preserving algorithms 210A-N uses Gaussian Mechanism and the failure probability parameter $\delta$=1e−6 and only the privacy loss parameter c is varied.

In various embodiments, the maximum privacy budget that party 202 can set is $\epsilon$=10 with a fixed $\delta$=1e−6. In various embodiments, party 202 specifies a maximum number of campaigns that a counterparty is allowed to run. In various embodiments, the data clean room computes the privacy budget per campaign and selects a suitable algorithm from the plurality of privacy-preserving models 210A-N to utilize for the particular data collaboration workflow that is being performed.

In various embodiments, privacy-preserving algorithms 210A-N refers to a set of one or more privacy-preserving algorithm(s) that may be utilized to train a privacy-preserving model, and the privacy-preserving model may be used to infer privacy-preserving labels. While FIG. 2 depicts an illustrative, non-limiting example in which greater than two algorithms (e.g., 210A, 210B, 210C, etc.) are available for selection, such need not be the case. In some embodiments, exactly two algorithms are available for selection. In some embodiments, a single algorithm is utilized and is chosen by default for use in a multi-party data collaboration workflow. The following include non-limiting, illustrative examples of privacy-preserving algorithms that can be utilized to generate private labels for individual users: private mean release, private balanced regression, private linear regression (AdaSSP), and DP-EBM (differentially private explainable boosting machine). A private mean release algorithm may comprise steps to release two mean vectors, including one computed from features of seed users, and the other candidate users, then relabels each user based on its distances to the two mean vectors. Features of individual users can be either embeddings or raw tabular data. In addition, the algorithm itself is linear. Sensitivity of mean vectors requires knowledge of the number of seed users, and the second aforementioned assumption helps to compute sensitivity without additional privacy risks.

The selection criteria for determining the appropriate privacy-preserving algorithm under a particular use case may be determined based at least in part on the privacy budget per campaign. As an example, it may be known a priori that the privacy-preserving labels that are to eventually be generated by the model are to be utilized to train a downstream target model such as a logistic regression model or multi-layer perceptron (MLP) model. Experimental data may be collected to determine the performance for a set of candidate privacy-preserving algorithms with each type of target model and the best model at different privacy budget levels may be ascertained. For example, experimental results may confirm that private mean release is most appropriate for privacy budgets of less than or equal to 1 and that DP-EBM performs best for privacy budgets of greater than 1. These examples should be taken to be illustrative and non-limiting in nature, and other criteria for performing selection of a particular privacy-preserving algorithm from among several candidate privacy-preserving algorithms are also contemplated within the scope of this disclosure.

Party 202 may contribute a dataset 208 with private labels to data clean room 204. The private labels may include sensitive or private user information that should not be exported by the data clean room 204 to other parties that interact with data clean room 204. The private labels may include user data that is subject to data governance policies. The private labels may be associated with specific users of a platform operated by party 202. For example, dataset 208 may comprise user interaction data with a publisher's platform, such as information regarding the user's purchases, browsing or search history, and so on and so forth. As another example, dataset 208 may comprise a patient's personal health information (PHI) which is to be protected. In various embodiments, data clean room 204 is configured to prevent sensitive data from being exported. In various embodiments, security policies on data clean room resources will indicate that sensitive data—such as private labels—in the data clean room is unexportable from the data clean room environment.

Dataset 208 may be imported into data clean room 204 and stored in database 214. Database 214 may, in some cases, be an optional component, such as when the datasets that are being utilized are small enough in size that they can be maintained entirely in volatile memory (e.g., RAM). Database 214 may provide for tabular data to be stored in database tables as records or rows, and to be retrieved based on queries. The queries may be utilized to obtain batches of data for training according to the selected privacy-preserving algorithm 212.

In various embodiments, selected privacy-preserving algorithm 212 refers to a privacy-preserving algorithm that is selected as a suitable algorithm for training a privacy-preserving model 218. In various embodiments, privacy-preserving model 218 is capable of generating privacy-preserving label from true labels that are provided by party 202. In various embodiments, the dataset 208 is stored in a database 214 and then subsequently retrieved from the database 214 for model training. In various embodiments, the dataset 208 may be in the form of tabular data in various formats (e.g., text, dates, strings, numerals, Booleans, and so on and so forth). An embedding algorithm may be applied on the raw tabular data to determine embedding vectors 216. In various embodiments, an embedding algorithm (e.g., one-hot encoding) is applied on the raw tabular data to create embedding vectors 216. These embedding vectors 216 may be numerical representations of users in a multi-dimensional space, designed to capture semantic relationships and similarities between users. In various embodiments, selected privacy-preserving algorithm 212 performing a training process based at least in part on the dataset 208 (e.g., embedding vectors derived therefrom) to produce a trained privacy-preserving model 218. Once trained, the privacy-preserving model 218 may be stored or otherwise made available within data clean room 204 for subsequent usage to infer privacy-preserving labels.

Figure 3:
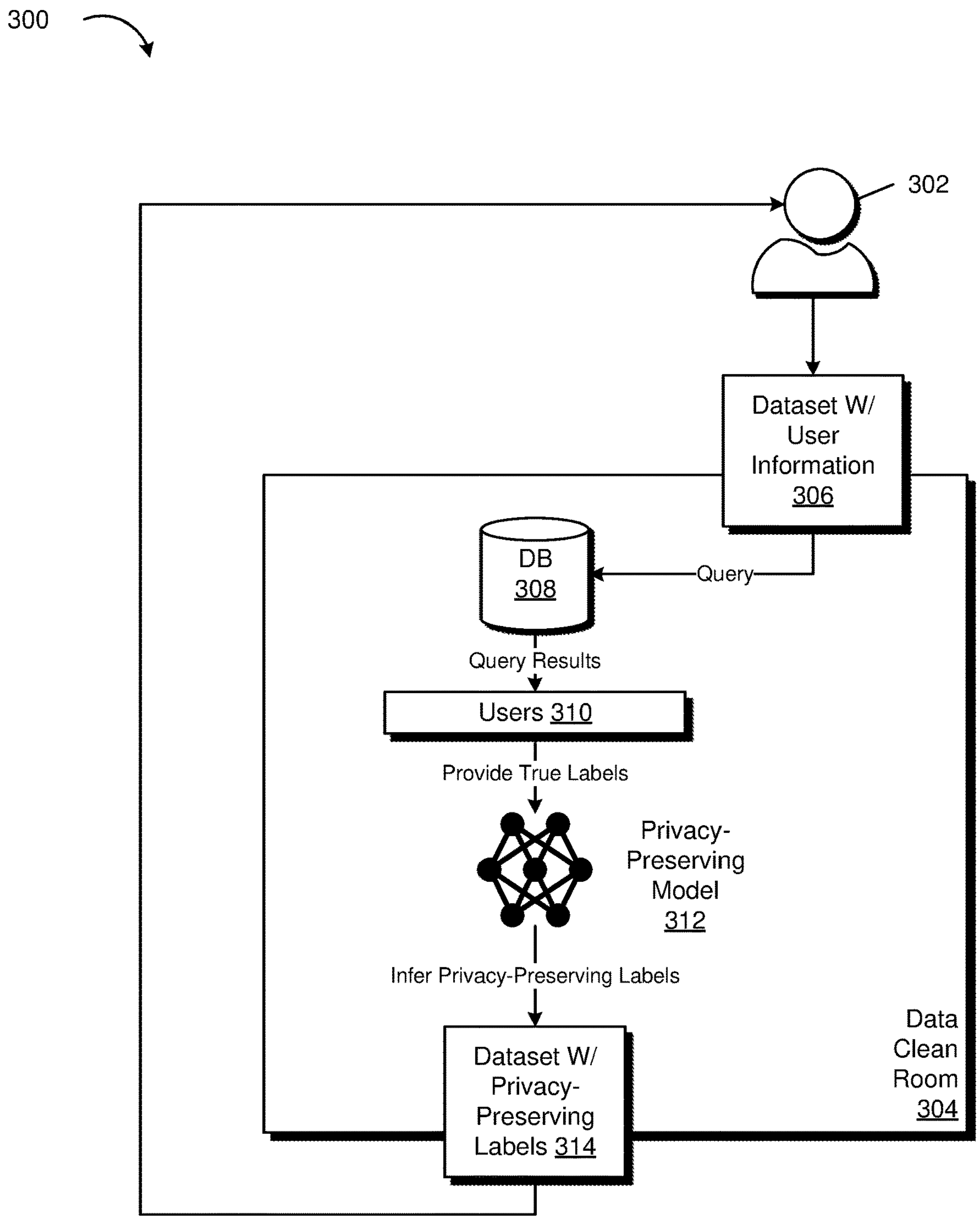
FIG. 3 illustrates a computing environment 300 in which a party to a data collaboration effort provides an input dataset with seed users to a data clean room environment to obtain an output dataset with privacy-preserving labels, in accordance with one or more example embodiments of the present disclosure.

FIG. 3 illustrates a computing environment 300 in which a party to a data collaboration effort provides an input dataset with user information to a data clean room environment to obtain an output dataset with privacy-preserving labels, in accordance with one or more example embodiments of the present disclosure.

According to at least one embodiment, computing environment 300 comprises a party 302 of a multi-party data collaboration effort, a data clean room 304, dataset 306 with user information, database 308, users 310, privacy-preserving model 312, and dataset 314 with privacy-preserving labels.

In various embodiments, party 302 refers to a participant of a multi-party data collaboration workflow that provides an input dataset of users to data clean room 304 and obtains an output dataset 314 with privacy-preserving labels. In various embodiments, the party 302 refers to an organization or computing entities under the control of said organization. Party 302 may electronically provide contributes to data clean room 304. In various embodiments, a protocol for a multi-party data collaboration workflow calls for party 302 to contribute dataset 306 with user information by transmitting such information over a communications network (e.g., via a secure connection) to a computing resource service provider that hosts and/or operates services for data clean room 304. In various embodiments, the seed users have some characteristic of interest to party 302. For example, if party 302 is a publisher, the seed users may be a set of users on the publisher's platform that has purchased a product or type of product and the publisher wishes to identify other similar users—so called "look-alike users"—that are similar to the seed users. As a second example, if party 302 is a medical research organization, they may be interested in obtaining data for a certain demographic of patients to train a machine-learning model for diagnosing or treating a disease.

Database 308 may refer to a database system or service that can be used to store and retrieve data. In various embodiments, database 308 is resident to data clean room 304 and includes sensitive data (e.g., private labels) that are not to be exported from the data clean room. In various embodiments, party 302 provides dataset 306 to data clean room 304 and a query is performed against database 308 to identify users of the database 308 that are similar to the seed users. For example, if party 302 is a publisher, then the database 308 may be populated by a dataset with private labels that was provided to the data clean room by an advertiser. In some embodiments, party 302 provides a subject identification information in the form of a query statement (not depicted in FIG. 3) to data clean room 304 that specifies the set of users that are of interest. In some embodiments, the subject identification information is presented in the form of a list of subject identifiers—for example, dataset 308 may comprise a list of subject identifiers that uniquely resolve to different subjects whose records may or may not be stored in database 308.

Users 310 may be obtained from the database and the dataset provided by party 302. In various embodiments, user identifiers are utilized to determine when a user is in both the database 308 and dataset 306. The true labels—which may contain sensitive or private information—associated with users may be returned as part of the query results.

In various embodiments, the true labels of users 310 are provided to a trained privacy-preserving model 312. Privacy-preserving model 312 may refer to a differential privacy (DP) machine-learning model that is trained on another party's dataset that contains private labels. Privacy-preserving model may be trained to generate privacy-preserving labels from true labels, for example, using techniques described throughout this disclosure, for example, those discussed in connection with FIG. 1, FIG. 2, FIG. 4, FIG. 5, and/or FIG. 6. Accordingly, for each true label of a user, privacy-preserving model 312 may infer a corresponding privacy-preserving label. Privacy-preserving labels may be true—in the sense that they match the underlying true labels inputted to a DP model—or false. The inferred privacy-preserving labels may be collected and provided as dataset 314. In various embodiments, dataset 314 comprises other information regarding the user that is non-sensitive, not otherwise subject to data governance policies that restrict their usage, or permission to use such data has been positively obtained. In various embodiments, dataset 314 with privacy-preserving labels is exported from data clean room 304 or otherwise made available to party 302. For example, dataset 314 may be provided to party 302 as part of a response to a web service request. In some embodiments, an online data storage location is provided to party 302, wherein the party 302 has received a grant of permission to access the online data storage location.

In various embodiments, party 302 may contribute their user-item interaction data, which can be used by data clean room 304 to learn an embedding model on top of the data to produce fixed-dimension vector embeddings for individual users. However, sometimes, party 302 may not wish to bring their user-item interaction data—therefore, data clean room 304 may not have data to learn vector embeddings. In such cases, and according to various embodiments, recommendations can be evaluated with two sets of datasets: evaluation metric and party's model. With regard to evaluation metric, at a recall threshold (e.g., 5%), each user is assigned with a score and user above the recall threshold (e.g., top 5% of users ranked by their scores) are selected as the expanded audience. The, recall metric may be computed using the ground-truth users. For the party's models, various types of models may be experimented on, such as logistic regression and linear regression model or multi-layer perceptron (MLP) model. With limited hyperparameter tuning done on individual models, empirical evidence suggested that logistic regression performed well as the publisher's model.

Figure 4:
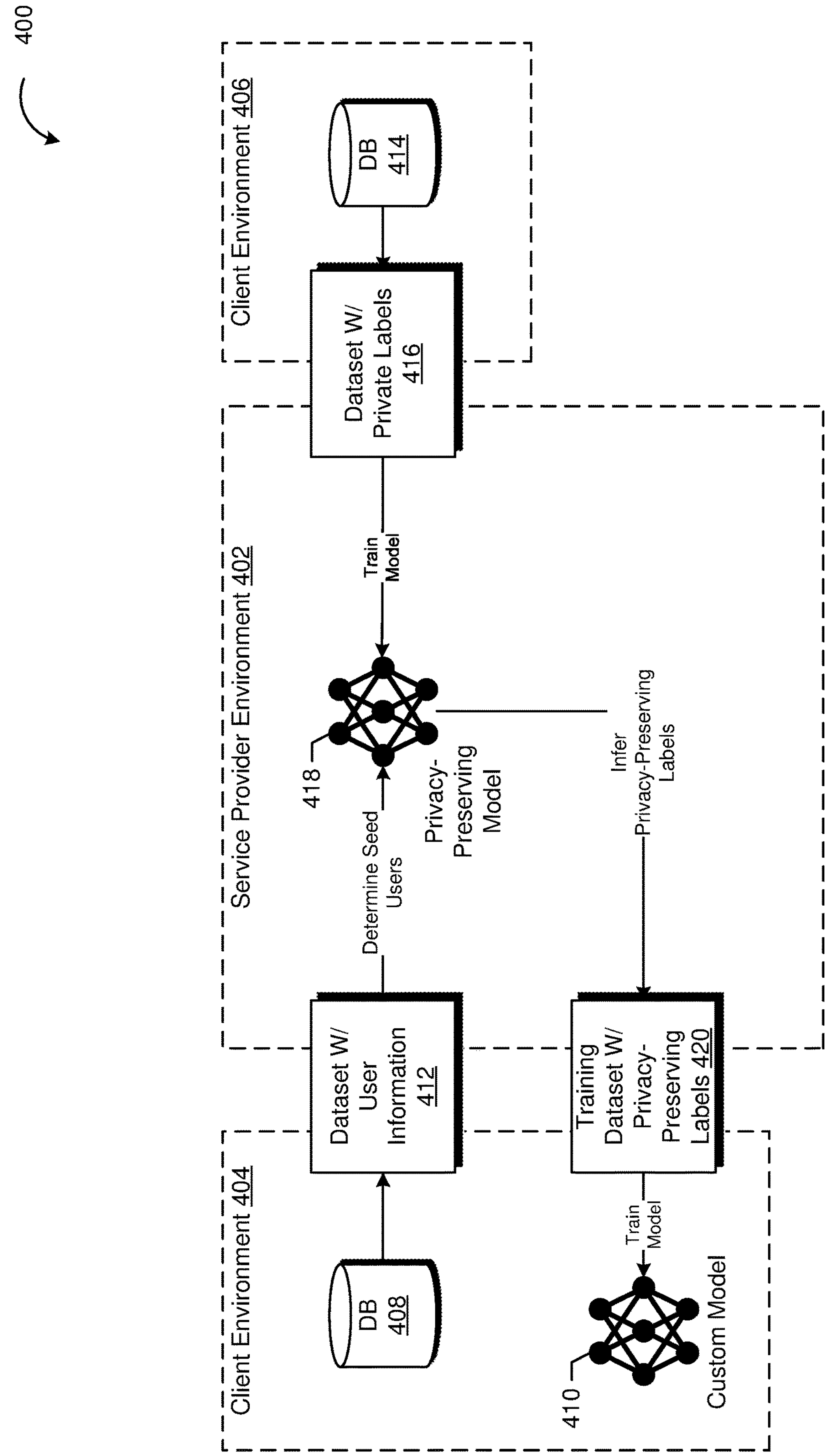
FIG. 4 illustrates a computing environment 400 in which a multi-party data collaboration workflow may be implemented, in accordance with one or more example embodiments of the present disclosure.

FIG. 4 illustrates a computing environment 400 in which a multi-party data collaboration workflow may be implemented, in accordance with one or more example embodiments of the present disclosure.

According to at least one embodiment, computing environment 400 comprises a service provider environment 402, a first client environment 404, a second client environment 406, first database 408, custom model 410, first dataset 412 with user information, second database 414, second dataset 416 with private labels, privacy-preserving model 418, and training dataset 420 with privacy-preserving labels.

In various embodiments, first client environment 404 may refer to a computing environment controlled by a first party or organization. The first party may store various user-related data using first database 408 or other storage systems. Such data may include sensitive or proprietary data that the organization does not wish to share with other organizations directly. For example, the first organization may be a publisher that wishes to use a group of seed users to generate an ad campaign for a larger group of users. In various embodiments, a group of seed users from first database 408 is identified and used to generate first dataset 412. This first dataset 412 may then be transmitted to the service provider environment 402, where it is imported to a data clean room (e.g., as discussed in connection with FIGS. 1-3).

In various embodiments, second client environment 406 may refer to a computing environment controlled by a second party or organization. The second party may store various user-related data using second database 414 or other storage systems. Such data may include sensitive or proprietary data that the organization does not wish to share with other organizations directly. For example, the second organization may be an advertiser that wishes to provide aggregate-level information regarding user interactions, but wishes to preserve the privacy of individual users and not directly expose user-level sensitive data that are included in second database 414. In various embodiments, the second party may agree to contribute second dataset 416 with private labels or other sensitive information towards a data collaboration effort, but will only do so if there are user-level privacy assurances. In various embodiments, the second party can specify a privacy budget that restricts the release of user-level information. The second party may agree to provide second dataset 416 including sensitive or private labels to a data clean room that is operated within the service provider environment (e.g., as discussed in connection with FIGS. 1-3).

Service provider environment 402 may refer to a third-party that is trusted by the participants of a multi-party data collaboration effort. Participants of a multi-party data collaboration effort may be clients of the service provider and communicate with the service provider—for example, to contribute datasets to a data clean room—via web service application programming interface (API) requests or commands. In various embodiments, web service APIs may be utilized by the participants of a multi-party data collaboration effort to provide or receive data, specify privacy budgets, select models, and so on and so forth. In various embodiments, a data clean room provisioned in the service provider environment 402 is configured to prevent sensitive data from being exported. In various embodiments, security policies on data clean room resources will indicate that sensitive data—such as private labels—in the data clean room is unexportable from the data clean room environment.

In various embodiments, second dataset 416 with private labels is utilized to train a privacy-preserving model 418. In various embodiments, a set of privacy parameters is provided to a data clean room of the service provider environment 402 (e.g., by the owner of sensitive or private data) that is used to select an appropriate privacy-preserving model from a plurality of privacy-preserving models. In various embodiments, first dataset with user information is provided to a data clean room of the service provider environment 402 to identify overlapping users of both datasets, identify "look-alike" users with similar characteristics of the seed user list to populate a training dataset. Instead of providing the true, private labels for those users, privacy-preserving model 418 may be utilized to infer privacy-preserving labels that provide assurances of differential privacy at the user level while still conveying information in the aggregate when the training dataset is considered as a whole. Training dataset 420 with privacy-preserving labels may be exported from the data clean room. For example, in some embodiments, the training dataset 420 with privacy-preserving labels is exported to client environment 404 where a custom model 410 can be trained locally within the client environment 404. A party of the multi-party data collaboration effort may wish to run the custom model 410 within their own computing environment—for example, so that they can tune hyperparameters based on domain-specific knowledge they have, or to fine-tune the model using other proprietary data that they do not wish or are prohibited from sharing even to a data clean room.

Figure 5:
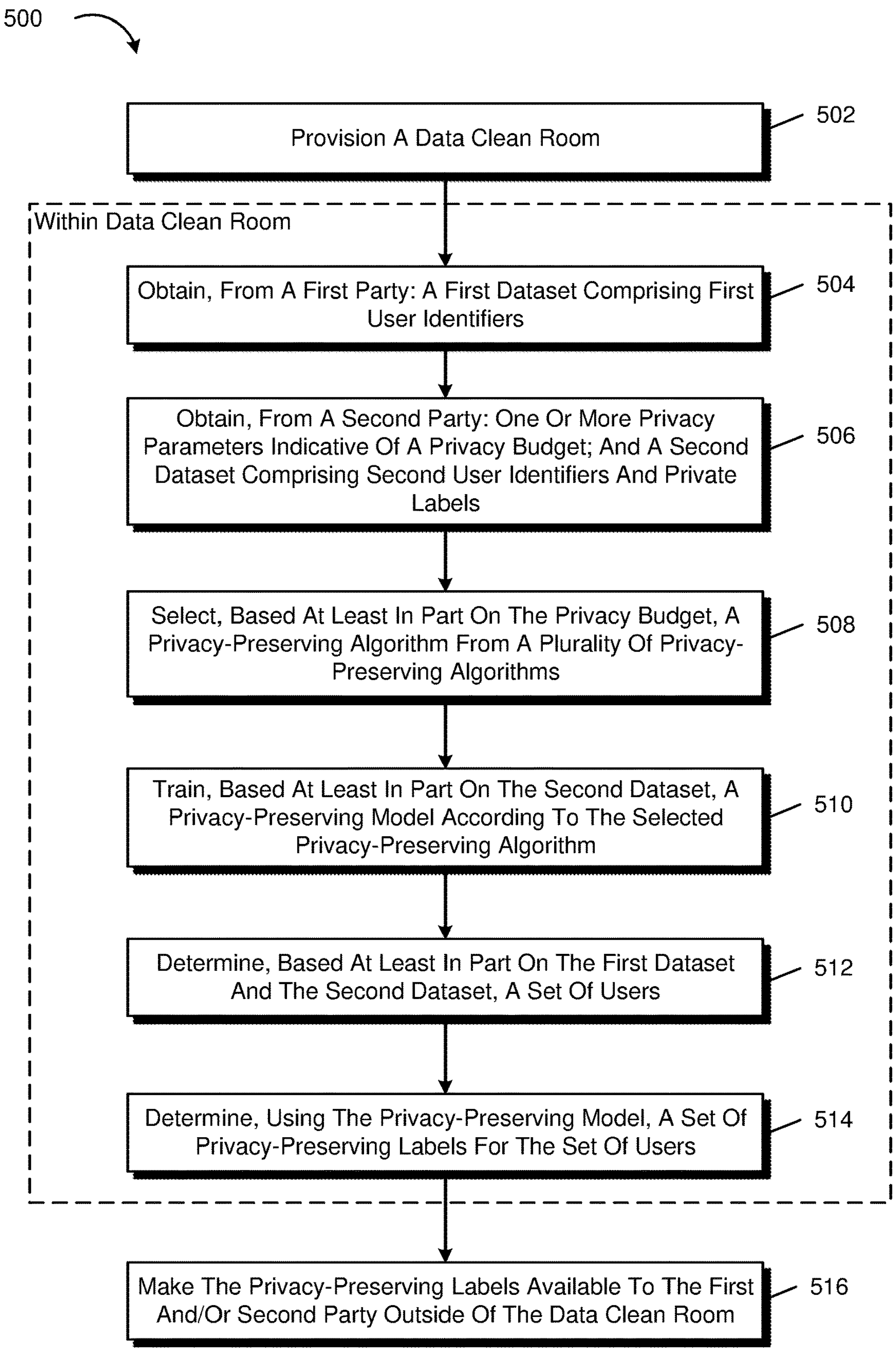
FIG. 5 shows an illustrative example of a process 500 for implementing a data clean room with exportable, privacy-preserving labels, in accordance with one or more example embodiments of the present disclosure.

FIG. 5 shows an illustrative example of a process 500 for implementing a data clean room with exportable, privacy-preserving labels, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1-4 and 6. In at least one embodiment, process 500 or a portion thereof is implemented by a computing resource service provider.

In at least one embodiment, process 500 comprises a step 502 to provision a data clean room. In various embodiments, a data clean room provides security functions that protect data and/or code that is utilized within the context of the data clean room. In various embodiments, the data clean room is provisioned with guidelines regarding how participants are and are not allowed to interact with the data clean room. For example, in some embodiments, datasets that are contributed to the data clean room are unexportable from the data clean room. The security of the data clean room may be implemented using hardware, software, or a combination thereof. For example, the data clean room may be initialized with security policies that prohibit unauthorized entities from accessing code and data within the data clean room. In some embodiments, the data clean room is implemented in the context of a protected execution environment, such as an enclave of a processor. In some embodiments, data storage locations are prepared for receiving datasets from collaborating entities. For example, a database may be provisioned with certain tables, indexes, etc. based on the expected format of the incoming data, which may be agreed upon ahead of time.

In at least one embodiment, process 500 comprises a step 504 to obtain, from a first party: a first dataset comprising user information. In various embodiments, the first party refers to a first computing entity under the control of a first organization, such as a publisher that wishes to run an ad campaign targeting users with characteristics similar to the seed users. In various embodiments, the first dataset is persisted in a database within the data clean room and is available to be retrieved by workflows executing within the data clean room. In various embodiments, the first dataset comprises user identifiers for corresponding users of the first party's platform, network, or system.

In at least one embodiment, process 500 comprises a step 506 to obtain, from a second party: one or more privacy parameters indicative of a privacy budget; and a second dataset comprising private labels. In various embodiments, the second party refers to a second computing entity under the control of a second organization, such as an advertiser that wishes to provide a publisher with information regarding click-through rates or purchase rates of a group of users matching certain demographic characteristics, but simultaneously does not wish to divulge the specific behavior of individual users within the group. In at least one embodiment, process 500 comprises a step 508 to select, based at least in part on the privacy budget, a privacy-preserving algorithm from a plurality of privacy-preserving algorithms. In various embodiments, the privacy budget is used to identify an appropriate privacy-preserving algorithm, such as a differential privacy (DP)-based machine-learning algorithm. In various embodiments, if the privacy loss parameter $\epsilon>1$ then a DP-EBM (differentially private explainable boosting machine) algorithm may be chosen as the selected model; and if $\epsilon\leq 1$, then private mean release may be chosen as the selected algorithm.

In at least one embodiment, process 500 comprises a step 510 to train, based at least in part on the second dataset, a privacy-preserving model according to the selected privacy-preserving algorithm. In various embodiments, an embedding algorithm is applied on the raw tabular data to determine embedding vectors. The model may be trained to infer privacy-preserving seed labels from the user vectors according to the selected algorithm. The trained ML model may then be used to compute privacy-preserving seed labels. A privacy-preserving label for a user may be true or false with respect to the underlying private label and provide for plausible deniability.

In at least one embodiment, process 500 comprises a step 512 to determine, based at least in part on the first dataset and the second dataset, a set of users. In various embodiments, the first party provides a query statement that is used to identify a set of users from the second party's dataset that is of interest. In some embodiments, the intersection between the first dataset and the second dataset is identified based on user identifier or other information that may uniquely identify that a first user in the first dataset has the same identity as a second user in the second dataset. For example, a user's biometrics, social security number, or other identifying information could be used to determine whether a user is in both datasets or not.

In at least one embodiment, process 500 comprises a step 514 to determine, using the trained privacy-preserving model, a set of privacy-preserving labels for the set of users. In various embodiments, the set of users are identified, embedding vectors are determined for the users, and then the embedding vectors are provided to the trained model to infer privacy-preserving labels. In various embodiments, the privacy-preserving labels are privacy-preserving at the user level and achieves differential privacy. Differential privacy aims to ensure that the inclusion or exclusion of any single individual's data does not significantly impact the output of a query or analysis. Plausible deniability is achieved by introducing randomness or noise to the data in a way that obscures the contribution of any single individual, making it difficult to determine whether a specific person's data is included in the dataset.

In at least one embodiment, process 500 comprises a step 516 to export the privacy-preserving labels from the data clean room and make them available. For example, one or both of the first and/or second parties may request access to the set of users and their corresponding privacy-preserving labels. The privacy-preserving labels may be utilized for a variety of purposes, such as downstream data analytics, for training custom models, and so on and so forth.

Figure 6:
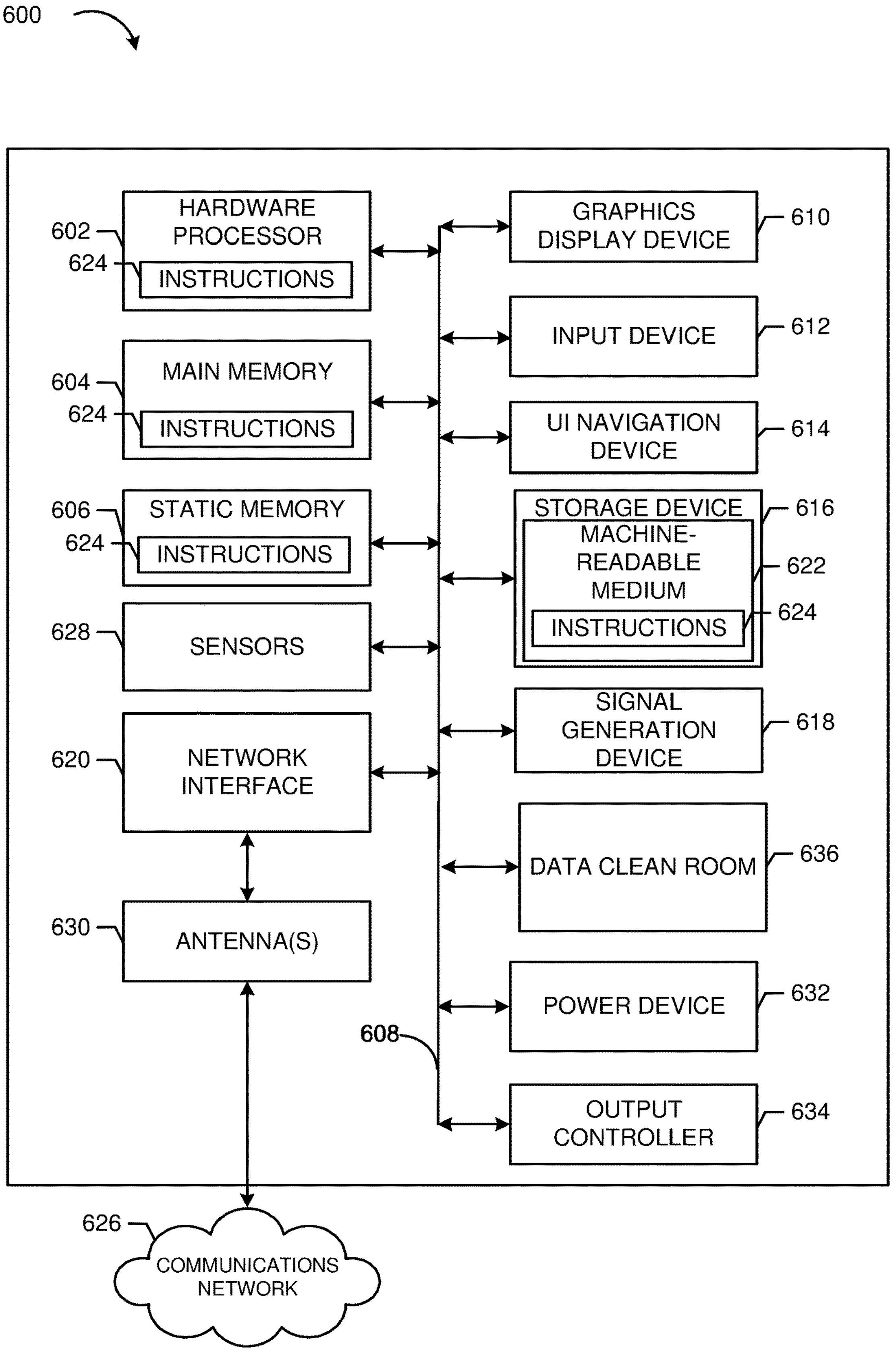
FIG. 6 illustrates a block diagram of an example machine 600 upon which any of one or more techniques (e.g., methods) may be performed, in accordance with one or more example embodiments of the present disclosure.

In various embodiments, an electronic system (e.g., implemented at least in part using machine 600 depicted in FIG. 6) comprises a processor and memory that stores executable instructions that, as a result of execution by the one or more processors, causes the system to perform a computer-implemented method. In various embodiments, a non-transitory, computer-readable medium stores executable instructions that, as a result of execution by one or more processors of a system, cause the system to perform a computer-implemented method for implementing a data clean room with exportable, privacy-preserving labels. In various embodiments, a computer-implemented method for implementing a data clean room with exportable, privacy-preserving labels comprises: provisioning, by a computing resource service provider, a data clean room, obtaining, in the data clean room: (i) from a first computing entity: a first dataset, wherein the first dataset comprises first subject identification information corresponds to a first set of subjects associated with the first computing entity, and (ii) from a second computing entity: (ii-a) a second dataset from a second computing entity, wherein the second dataset comprises: (ii-a-1) second subject information corresponding to a second set of subjects that are associated with the second computing entity and (ii-a-2) a set of true labels associated with the second set of subjects and that the set of true labels are unexportable from the data clean room, and (ii-b) one or more privacy parameters. In various embodiments, the method further comprises, within the data clean room: selecting a differential privacy machine-learning algorithm from a plurality of differential privacy machine-learning algorithms, training, based at least in part on the second dataset, a differential privacy machine-learning model according to the selected differential privacy machine-learning algorithm, determining, based at least in part on the first dataset and the second dataset, a set of subjects, inferring, in the data clean room and using the differential privacy machine-learning model, a set of privacy-preserving labels for the set of subjects, determining a training dataset based at least in part on the set of privacy-preserving labels and the set of subjects, and making the training dataset available to the first computing entity. Subjects may refer to pets, humans, machines, intangible entities (e.g., program instances, websites, etc.). In various embodiments, the set of subjects that is determined from the first dataset and the second dataset comprises overlapping subjects that are in both datasets. In some embodiments, the set of subjects is determined by (i) determining the overlapping subjects in both the first and second datasets and then (ii) identifying additional subjects that are similar to the overlapping subjects (e.g., similar interaction data or patterns).

In various embodiments, a method described above further comprises: determining a privacy budget based at least in part on the one or more privacy parameters, the one or more privacy parameters including at least a privacy loss parameter specified by the second computing entity, and the differential privacy machine-learning algorithm is selected based at least in part on the privacy budget.

In various embodiments, a method described above is characterized by the plurality of differential privacy machine-learning models comprising at least: a private mean release algorithm and a DP-EBM (differentially private explainable boosting machine) algorithm.

In various embodiments, a method described above further comprises: determining, subsequent to the inference of the set of privacy-preserving labels, an amount of privacy loss, determining an updated privacy budget based at least in part on the amount of privacy loss, obtaining, from the first computing entity, a request for a second training dataset, determining, based at least in part on the updated privacy budget, whether there is sufficient remaining privacy to fulfill the request, and contingent upon the updated privacy budget being sufficient, fulling the request.

In various embodiments, an electronic system (e.g., implemented at least in part using machine 600 depicted in FIG. 6) comprises a processor and memory that stores executable instructions that, as a result of execution by the one or more processors, causes the system to perform a computer-implemented method. In various embodiments, a non-transitory, computer-readable medium stores executable instructions that, as a result of execution by one or more processors of a system, cause the system to perform a computer-implemented method for implementing a data clean room with exportable, privacy-preserving labels. In various embodiments, a system comprises one or more processors, and memory storing executable instructions that, as a result of execution by the one or more processors, cause the system to obtain, from a computing entity associated with a multi-party data collaboration effort: (i) at least a portion of a dataset comprising sensitive data associated with a set of subjects, and (ii) at least one privacy parameter, store the dataset in a data clean room, such that the sensitive data is unexportable from the data clean room, determine a plurality of privacy-preserving algorithms, select, from the plurality of privacy-preserving algorithms and based at least in part on the at least one privacy parameter, a privacy-preserving algorithm, and use the dataset to train a privacy-preserving model according to the privacy-preserving algorithm. In various embodiments, sensitive data is protected and made unexportable using a variety of software and/or hardware mechanism. For example, security policies of a computing resource service provider may be utilized to specify that such resources cannot be exported from the data clean room.

In various embodiments, a system described above is further characterized wherein the sensitive data is subject to one or more security policies that prohibit the set of private labels from being exported from the data clean room. In some embodiments, a data clean room is provisioned within a protected execution environment that provides hardware-level protections that prevent sensitive data (e.g., private labels) from being exported from the protected execution environment. Examples of protected execution environments include an enclave of a processor utilizing Intel Secure Guard eXtensions (SGX) technology and a trusted platform module (TPM).

In various embodiments, a system described above is further characterized by the executable instructions including further instructions that, as a result of execution by the one or more processors, further cause the system to: determine, based at least in part on the dataset, tabular data, determine, for the tabular data, embedding vectors, and provide the embedding vectors to the privacy-preserving model to infer the privacy-preserving labels.

In various embodiments, a system described above is further characterized by the executable instructions including further instructions that, as a result of execution by the one or more processors, further cause the system to: determine, based at least in part on the at least one privacy parameter, a privacy budget, and select the privacy-preserving algorithm based at least in part on the privacy budget.

In various embodiments, a system described above is further characterized by a private mean release algorithm that is associated with a first range of privacy budget values, a DP-EBM (differentially private explainable boosting machine) algorithm that is associated with a second range of privacy budget values, and the first range being less than the second range. In various embodiments, private mean release is most appropriate for privacy budgets of less than or equal to 1 and that DP-EBM performs best for privacy budgets of greater than 1 but less than 20. In various embodiments, if a privacy budget of greater than 20 is specified, the data clean room may return an error or warning. In some embodiments, this upper threshold can be overridden by the party contributing the private/sensitive data. In some embodiments, the data clean room platform provides an upper threshold that cannot be overridden to ensure that there is a certain level of privacy protection for user data under all circumstances.

In various embodiments, a system described above is further characterized by the executable instructions including further instructions that, as a result of execution by the one or more processors, further cause the system to: obtain, from a second computing entity, a second portion of the dataset. For example, in some cases, a publisher may collaborate with multiple advertisers that each contribute their own datasets with user interaction data (e.g., including sensitive data or private labels). In various embodiments, a privacy budget is agreed upon a prior by all parties of such a collaboration effort. In some embodiments, each advertiser specifies a privacy budget and the lowest privacy budget (i.e., the most restrictive budget) is selected for use with the datasets of all of the advertisers.

In various embodiments, a system described above is further characterized by the at least one privacy parameters comprising at least one of: a privacy loss parameter c, a failure probability In various embodiments, an electronic system (e.g., implemented at least in part using machine 600 depicted in FIG. 6) comprises a processor and memory that stores executable instructions that, as a result of execution by the one or more processors, causes the system to perform a computer-implemented method. In various embodiments, a non-transitory, computer-readable medium stores executable instructions that, as a result of execution by one or more processors of a system, cause the system to perform a computer-implemented method for implementing a data clean room with exportable, privacy-preserving labels. In various embodiments, a non-transitory computer-readable storage medium storing executable instructions that, as a result of being executed by one or more processors of a computer system, cause the computer system to at least: obtain, from a first computing entity, a request to generate a training dataset, the request comprising subject identification information indicative of a first set of subjects, query a database that stores records for a second set of subjects associated with a second computing entity, to determine: (i) a set of subjects, including at least an overlapping set of subjects that are in both the first and second sets of subjects, and (ii) a set of private labels for the set of subjects, obtain a privacy-preserving model, wherein records for the second set of subjects have been used to train the privacy-preserving model to infer privacy-preserving labels from private labels, use the privacy-preserving model to infer a corresponding set of privacy-preserving labels for the set of subjects, and determine the training dataset, wherein the training dataset comprises the set of subjects and the corresponding set of privacy-preserving labels.

In various embodiments, a non-transitory computer-readable storage medium described above is further characterized wherein the database is resident to a data clean room and the set of private labels are unexportable from the data clean room.

In various embodiments, a non-transitory computer-readable storage medium described above is further characterized wherein the set of private labels are subject to one or more security policies that prohibit the set of private labels from being exported from the data clean room.

In various embodiments, a non-transitory computer-readable storage medium described above is further characterized wherein the training data is encoded in a format for the first computing entity to train a machine-learning model remote from the data clean room.

In various embodiments, a non-transitory computer-readable storage medium described above is further characterized wherein the information indicative of the set of users is a list of users or a query statement that is to be provided to the database to determine the set of users.

In various embodiments, a non-transitory computer-readable storage medium described above includes further instructions that that, as a result of being executed by one or more processors of a computer system, cause the computer system to at least: determine a privacy budget based at least in part on one or more privacy parameters obtained from the second computing entity, determine that sufficient budget remains for determining the training dataset, and the privacy-preserving model is utilized to infer the corresponding set of privacy-preserving labels contingent upon successfully determining that there is sufficient budget remaining.

In various embodiments, a non-transitory computer-readable storage medium described above is further characterized wherein the privacy-preserving model is a private mean release model or a DP-EBM (differentially private explainable boosting machine) model.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

FIG. 6 illustrates a block diagram of an example of a machine 600 (e.g., implemented in whole or in part in the context of embodiments described in connection with other figures. In some embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (e.g., drive unit) 616, a signal generation device 618, and a network interface device/transceiver 620 coupled to antenna(s) 630. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

In various embodiments, a computing resource service provider is implemented using one or more machines (e.g., a machine such as machine 600 depicted in FIG. 6) that individually and/or collectively implement computing services such as data clean room services. For example, machine 6 may individually implement a data clean room using hardware, software, or a combination thereof. In some embodiments, a scalable fleet of machines collectively implements data clean room 636. For example, a plurality of machines 600 operated by a computing resource service provider may each have processors or other compute resources that collectively provide data clean room services, such as those described in connection with FIGS. 1-5. A plurality of machines may each have processor(s) and memory that stores executable instructions that collectively implements clean room functionality as described in this disclosure. As an illustrative, non-limiting example, one machine may implement some steps/functionality related to data clean rooms and another machine may implement other steps/functionality. For example, a fleet of machines may collectively perform training of a privacy-preserving machine-learning model as described herein. Various technique steps described herein may be executed concurrently by multiple processors of multiple machines to expedite performance of said steps.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives “first,” “second,” “third,” etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A computer-implemented method, comprising:
- provisioning, by a computing resource service provider, a data clean room;
- obtaining, in the data clean room:
  - from a first computing entity: a first dataset, wherein the first dataset comprises first subject identification information corresponding to a first set of subjects associated with the first computing entity; and
  - from a second computing entity:
    - a second dataset from a second computing entity, wherein the second dataset comprises:
      - second subject identification information corresponding to a second set of subjects that are associated with the second computing entity;
      - a set of true labels associated with the second set of subjects; and
      - wherein the set of true labels are unexportable from the data clean room; and
    - one or more privacy parameters;
- within the data clean room:
  - selecting a differential privacy machine-learning algorithm from one or more differential privacy machine-learning algorithms, based at least in part on the one or more privacy parameters;

training, based at least in part on the second dataset, a differential privacy machine-learning model according to the selected differential privacy machine-learning algorithm;

determining, based at least in part on the first dataset and the second dataset, a set of subjects;

inferring, using the differential privacy machine-learning model, a set of privacy-preserving labels for the set of subjects;

determining a training dataset based at least in part on the set of privacy-preserving labels and the set of subjects; and making the training dataset available to the first computing entity.

2. The computer-implemented method of claim 1, further comprising:

determining a privacy budget based at least in part on the one or more privacy parameters, the one or more privacy parameters including at least a privacy loss parameter specified by the second computing entity; and the differential privacy machine-learning algorithm is selected based at least in part on the privacy budget.

3. The computer-implemented method of claim 1, wherein the one or more differential privacy machine-learning algorithms comprises at least: a private mean release algorithm and a DP-EBM (differentially private explainable boosting machine) algorithm.

4. The computer-implemented method of claim 1, further comprising:

determining, subsequent to the inference of the set of privacy-preserving labels, an amount of privacy loss;

determining an updated privacy budget based at least in part on the amount of privacy loss;

obtaining, from the first computing entity, a request for a second training dataset;

determining, based at least in part on the updated privacy budget, whether there is sufficient remaining privacy to fulfill the request; and contingent upon the updated privacy budget being sufficient, fulling the request.

5. A system, comprising:

one or more processors; and memory storing executable instructions that, as a result of execution by the one or more processors, cause the system to:

obtain, from a computing entity associated with a multi-party data collaboration effort:

at least a portion of a dataset comprising sensitive data associated with a set of subjects; and at least one privacy parameter;

store the dataset in a data clean room, such that the sensitive data is unexportable from the data clean room;

select, from one or more plurality of privacy-preserving algorithms and based at least in part on the at least one privacy parameter, a privacy-preserving algorithm; and use the dataset to train a machine-learning model according to the privacy-preserving algorithm.

6. The system of claim 5, wherein the sensitive data is subject to one or more security policies that prohibit the sensitive data from being exported from the data clean room.

7. The system of claim 5, wherein the executable instructions include further instructions that, as a result of execution by the one or more processors, further cause the system to:

determine, based at least in part on the dataset, tabular data;

determine, for the tabular data, embedding vectors; and use the embedding vectors to train the machine-learning model.

8. The system of claim 5, wherein the executable instructions include further instructions that, as a result of execution by the one or more processors, further cause the system to:

determine, based at least in part on the at least one privacy parameter, a privacy budget; and select the privacy-preserving algorithm based at least in part on the privacy budget.

9. The system of claim 8, wherein:

a private mean release algorithm is associated with a first range of privacy budget values;

a DP-EBM (differentially private explainable boosting machine) algorithm is associated with a second range of privacy budget values; and the first range is less than the second range.

10. The system of claim 8, wherein the executable instructions include further instructions that, as a result of execution by the one or more processors, further cause the system to:

obtain, from a second computing entity, a second portion of the dataset.

11. The system of claim 5, wherein the at least one privacy parameters comprise at least one of: a privacy loss parameter c, a failure probability parameter δ, or a concentrated differential privacy parameter p.

12. The system of claim 11, wherein the failure probability parameter S has a fixed value.

13. A non-transitory computer-readable storage medium storing executable instructions that, as a result of being executed by one or more processors of a computer system, cause the computer system to at least:

obtain, from a first computing entity, a request to generate a training dataset, the request comprising subject identification information indicative of a first set of subjects;

query a database that stores records for a second set of subjects associated with a second computing entity, to determine:

a set of subjects, including at least an overlapping set of subjects that are in both the first and second sets of subjects; and a set of private labels for the set of subjects;

obtain, from the second computing entity, one or more privacy parameters;

select, from a plurality of privacy-preserving algorithms and based at least in part on the one or more privacy parameters, a privacy-preserving algorithm;

use a privacy-preserving model trained according to the selected privacy-preserving algorithm to infer a corresponding set of privacy-preserving labels for the overlapping set of subjects; and determine the training dataset, wherein the training dataset comprises the overlapping set of subjects and the corresponding set of privacy-preserving labels.

14. The non-transitory computer-readable storage medium of claim 13, wherein the database is resident to a data clean room and the set of private labels are unexportable from the data clean room.

15. The non-transitory computer-readable storage medium of claim 14, wherein the set of private labels are subject to one or more security policies that prohibit the set of private labels from being exported from the data clean room.

16. The non-transitory computer-readable storage medium of claim 14, wherein the training data is encoded in a format for the first computing entity to train a machine-learning model remote from the data clean room.

17. The non-transitory computer-readable storage medium of claim 16, wherein the machine-learning model is a logistic regression model or a multi-layer perceptron.

18. The non-transitory computer-readable storage medium of claim 13, wherein the instructions include further instructions that, as a result of being executed by one or more processors of a computer system, cause the computer system to at least:

determine a privacy budget based at least in part on one or more privacy parameters obtained from the second computing entity;

determine that sufficient budget remains for determining the training dataset; and the privacy-preserving model is utilized to infer the corresponding set of privacy-preserving labels contingent upon successfully determining that there is sufficient budget remaining.

19. The non-transitory computer-readable storage medium of claim 13, wherein the privacy-preserving model is a private mean release model or a DP-EBM (differentially private explainable boosting machine) model.

20. The non-transitory computer-readable storage medium of claim 13, wherein the subject identification information is a list of subjects or a query statement that is to be provided to the database to determine the overlapping set of subjects.

* * * * *